United States Patent
Kshetrapal et al.

(10) Patent No.: US 7,383,535 B1
(45) Date of Patent: Jun. 3, 2008

(54) SYSTEM AND METHOD FOR IMPLEMENTING CODE HOOKS IN A WEB-BASED ENVIRONMENT

(75) Inventors: Sanjay Kshetrapal, Apple Valley, MN (US); Michael C. Minnick, Apple Valley, MN (US); Venkatesh N. Pazhyanur, Eagan, MN (US); Scott A. Jungers, Inner Grove Heights, MN (US); Todd M. Rasmus, Apple Valley, MN (US)

(73) Assignee: Unisys Corporation, Blue Bell, PA (US)

( * ) Notice: Subject to any disclaimer, the term of this patent is extended or adjusted under 35 U.S.C. 154(b) by 681 days.

(21) Appl. No.: 10/689,912

(22) Filed: Oct. 21, 2003

Related U.S. Application Data

(60) Provisional application No. 60/497,584, filed on Aug. 25, 2003.

(51) Int. Cl.
*G06F 9/44* (2006.01)
(52) U.S. Cl. ...................... 717/122; 717/169
(58) Field of Classification Search ........ 717/106–109, 717/120–123, 168–170
See application file for complete search history.

(56) References Cited

U.S. PATENT DOCUMENTS 6,256,031 B1 * 7/2001 Meijer et al. ............... 715/854

OTHER PUBLICATIONS

Bay Networks, "Using Optivity Service Level Analysis 2.1", Bay Networks, Inc., pp. i-xxi, Chapter 1:1-13, chapter 2:1-19, chapter 3:1-25, chapter 4:1-27, chapter 5:1-20, chapter 6:1-17, chapter 7:1-51, chapter 8:1-6, Appendix A:1-15, Appendix B:1-13, Glossary 1-15.*
Oracle, "Oracle Configurator Toolkit Developer Guide", May 2000, Oracle Corporation, pp. i-xvi, Chapter 1:1-6, chapter 2:1-24, chapter 3:1-20, chapter 4:1-12, chapter 5:1-12, chapter 6:1-8, chapter 7:1-6, Appendix A:1-4, Appendix B:1-4, Appendix C:1-4, Appendix D:1-8.*

* cited by examiner

*Primary Examiner*—Ted T Vo
(74) *Attorney, Agent, or Firm*—Charles A. Johnson; Robert Marley; Crawford Maunu PLLC

(57) ABSTRACT

A system and method for creating and supporting multiple customized versions of a software application within a web-based environment is disclosed. Customized code is created for a user of the software application. This code is invoked by inserting code hooks such as subroutine calls into the software application. The file containing the customized code is moved to a respective physical directory created for the user. An association is then created between this physical directory and a virtual directory of the type supported by IIS and other similar web servers. Finally, the virtual directory and the customized code file are identified by a reference provided with the software application. When a run-time version of the code is generated for the user, this reference along with the association created between the virtual and physical directories result in generation of a user-specific version of the software application.

25 Claims, 7 Drawing Sheets

| | | |
|---|---|---|
| Website 1 | Virtual_local_directory | user1_directory |
| ⋮ | ⋮ | ⋮ |
| Website N | Virtual_local_directory | userN_directory |

*Figure 3B*

SYSTEM AND METHOD FOR IMPLEMENTING CODE HOOKS IN A WEB-BASED ENVIRONMENT

CLAIM OF PRIORITY TO PARENT APPLICATION

This application claims priority to provisionally filed U.S. Patent Application Ser. No. 60/497,584 filed Aug. 25, 2003, which is incorporated herein by reference in its entirety.

FIELD OF THE INVENTION

The current invention relates generally to a mechanism for supporting and executing multiple versions of software on a server; and, more particularly, relates to a system and method for providing local code hooks in a web-based environment.

BACKGROUND OF THE INVENTION

Software packages can be obtained to perform many day-to-day tasks. For example, banking, tax preparation, bill paying, grocery shopping, and financial planning are just some of the many activities that can be performed with the aid of software programs.

Many of the commodity software packages that are commercially available today are intended to be loaded onto a user's computer system and executed "as is". In other words, the software licensor and/or vendor are not in the business of customizing the software for a particular customer. In the large majority of cases involving such software packages, this type of customization is not necessary, since the "off-the-shelf" functionality will satisfy the needs of most users. Moreover, customization of this type of commodity product would not be economically viable, and would present daunting support issues.

The foregoing is not true in instances involving large, complex software systems of the type that may control banking or transportation applications, however. For example, consider a cargo management system employed to schedule the transport of cargo on airplane flights. Such a system must generally take into consideration particularities associated with a particular user such as an airline carrier. For instance, it may be necessary or even mandatory that the system conforms to the airline's safety and business requirements. The system may also be required to reflect the type of equipment and aircraft that will be used to transport the cargo. It may also be desirable to make the system conform to the "look and feel" of the other tools used by the specific airlines so that the system is more user-friendly to employees.

Large complex systems of the type discussed above are not generally considered commodity products. They are developed for a small, specialized group of customers that are willing to finance the customization activities. If this is the case, the software developer may create a specialized version of the software that includes functionality that is needed by a specific customer and is only provided to that customer. Another version may be developed for another client, and so on.

If multiple versions of a particular software product are developed in the foregoing manner, support issues become problematic. When a common function is added to the system, each of the versions must be updated separately to incorporate the new code. A similar problem exists when a coding error is discovered in one of the common functions. The problem must be fixed by updating each of the software versions independently. Additionally, revision control becomes more complicated, since code levels must be tracked for each code version.

One way to solve the foregoing problem is to maintain the functionality for all customers within a single integrated version of the code. User-specific functionality is selected using conditional logic. For example, a variable is assigned a value that corresponds to customer identification. When a function containing user-specific code is called, the variable is tested to determine how the function should be completed. In this manner, only a single version of the code must be supported. Additionally, revision control is simplified.

While the foregoing mechanism may make code support more efficient, it results in a software application that may be much larger than if the conditional logic and user-specific functionality were not included. Since all functionality is integrated into a single package, the amount of memory required to load and execute the software will increase. This increase may become prohibitive. Additionally, when an update is entered for one customer, the entire software package may have to be recompiled. This can be very time consuming.

In addition to the above-described challenges, more of today's software applications are adapted to be accessed via the Internet or worldwide web. In this type of environment, user requests are generally issued by a client system to a server. In response to such a request, a server may initiate some type of data processing activity or perform a database query, then return requested data to the client system. This type of scenario is very common in many of today's e-commerce applications, for example. A flexible mechanism is needed to support multiple versions of a software application that is adapted for use in this type of a web-based environment.

What is needed, therefore, is an improved system and method for addressing the foregoing problems and challenges.

SUMMARY OF THE INVENTION

The current invention provides a system and method for creating and supporting multiple customized versions of a software application within a web-based environment. According to the method, the software application is implemented using standardized code that is adapted for use by multiple users. One or more customized code files are created for the software application, each to support requirements of a respective user of the standardized code. For example, a customized code file may include one or more subroutines that add customized functionality to, or modify the default functionality of, the standardized code. These one or more subroutines are called from the standardized code by inserting "code hooks", which are invocations to the newly created code. If a user does not require this type of customization, a respective customized code file may be created for that user that merely returns to the calling program or provides standard functionality, for example.

Next, a reference is provided with the standardized code that identifies a virtual directory as well as the customized code. The customized code may be identified using a file name containing the customized code, and the virtual directory is identified using a virtual directory pathname.

As known in the art, a virtual directory is a pointer that identifies an actual physical directory. Using a virtual directory rather than a physical directory provides a level of indirection when specifying a directory path. This mechanism is supported by web servers such as Internet Information Services (IIS) commercially available from Microsoft Corporation, and other similar technologies.

Before it can be used, a virtual directory name must be associated with one or more physical directories. This is accomplished by providing data that correlates a physical directory name with the virtual directory name. Data forming this association may be stored within a database such as a metadatabase maintained by a web server.

According to one embodiment of the invention, when customized code is created for a user of the software application, the customized code file is located within a respective physical directory created for that user. That physical directory is associated with the virtual directory using a database entry in the manner discussed above. Sometime thereafter, a run-time version of the code is generated for the user. During this process, the virtual directory that is referenced with the standardized code is mapped to a physical directory using the association created in the database. This physical directory and the file name that is referenced with the standardized code is used to locate the user's customized code, which is then included with the standardized code to create a run-time version that includes functionality specific to the user's requirements.

In one embodiment of the invention, each user of the software application is associated with a website on a server. The server stores standard code as well as customized code for each of the users. A run-time version of a user's code, which is generated in a manner discussed above, is accessed via the user's website address or other indicia uniquely identifying the user.

According to one aspect of the invention, a method of creating a customized version of software is disclosed. The method includes creating local code for the software, updating the software to call the local code, and making a reference to a virtual directory and the local code to include the local code in the software. The method further includes associating the virtual directory with a physical directory in which the local code resides.

In another embodiment, a system to support standard code that is customized for one or more users is provided. The system includes a memory to store the standard code and associated local code, wherein a respective version of the local code is provided for each of the users. The system also includes web server software stored within the memory to support virtual directories, and to associated each version of the local code with the standard code using a reference to a virtual directory. The system further comprises data stored within the memory to associate, for each of the users, the virtual directory with a respective physical directory, wherein the respective physical directory contains the respective version of the local code provided for the user.

In still another embodiment, a data processing system is described that includes memory means for storing standard code and one or more versions of customized code for the standard code, and web server means for supporting virtual directories, and for allowing the customized code to be included with the standard code by providing a reference that identifies a virtual directory pointing to the customized code. The memory means includes circuits for storing data to associate a virtual directory with a physical directory for an identified user, wherein the associated physical directory stores a respective version of the customized code for the user.

Another embodiment of the invention is provided for use with a data processing system that supports virtual directories that each point to a physical directory. The embodiment generates run-time code from standard code and customized code that is customized for a particular user. The invention includes first memory circuits to store the standard code and the customized code, wherein the standard code provides a reference to a virtual directory. The invention further includes second memory circuits to store data associating the virtual directory with a physical directory containing the customized code. Additionally, the inventive system may include a processor coupled to obtain data stored within the first and second memory circuits, the processor to utilize the reference provided by the standard code and the data associating the virtual and physical directories to identify the customized code, and to generate the run-time code including the standard code and the customized code.

According to another aspect of the invention, a method is provided that is adapted for use on a data processing system that stores a standard software application and multiple versions of customized code developed for use with the standard software application. The data processing system supports virtual directories, each pointing to a physical directory that is respectively associated with a user of the data processing system. The method, which is directed to processing requests that are directed to the standard software application, includes the steps of receiving a request identifying a user of the data processing system and the standard software application, and identifying a virtual directory that is associated with the standard software application. The method further includes identifying a respective physical directory associated with the user and that is pointed to by the virtual directory, obtaining a version of the customized code that is adapted for the user from the physical directory, and generating a run-time version of the code that includes the standard software application and the version of the customized code that is adapted for the user.

Other scopes and aspects of the invention will become apparent from the following description and the accompanying drawings.

BRIEF DESCRIPTION OF THE DRAWINGS

FIG. 3B is a table illustrating exemplary database entries for associating a virtual directory with respective physical directories.

DESCRIPTION OF THE INVENTION

Figure 1:
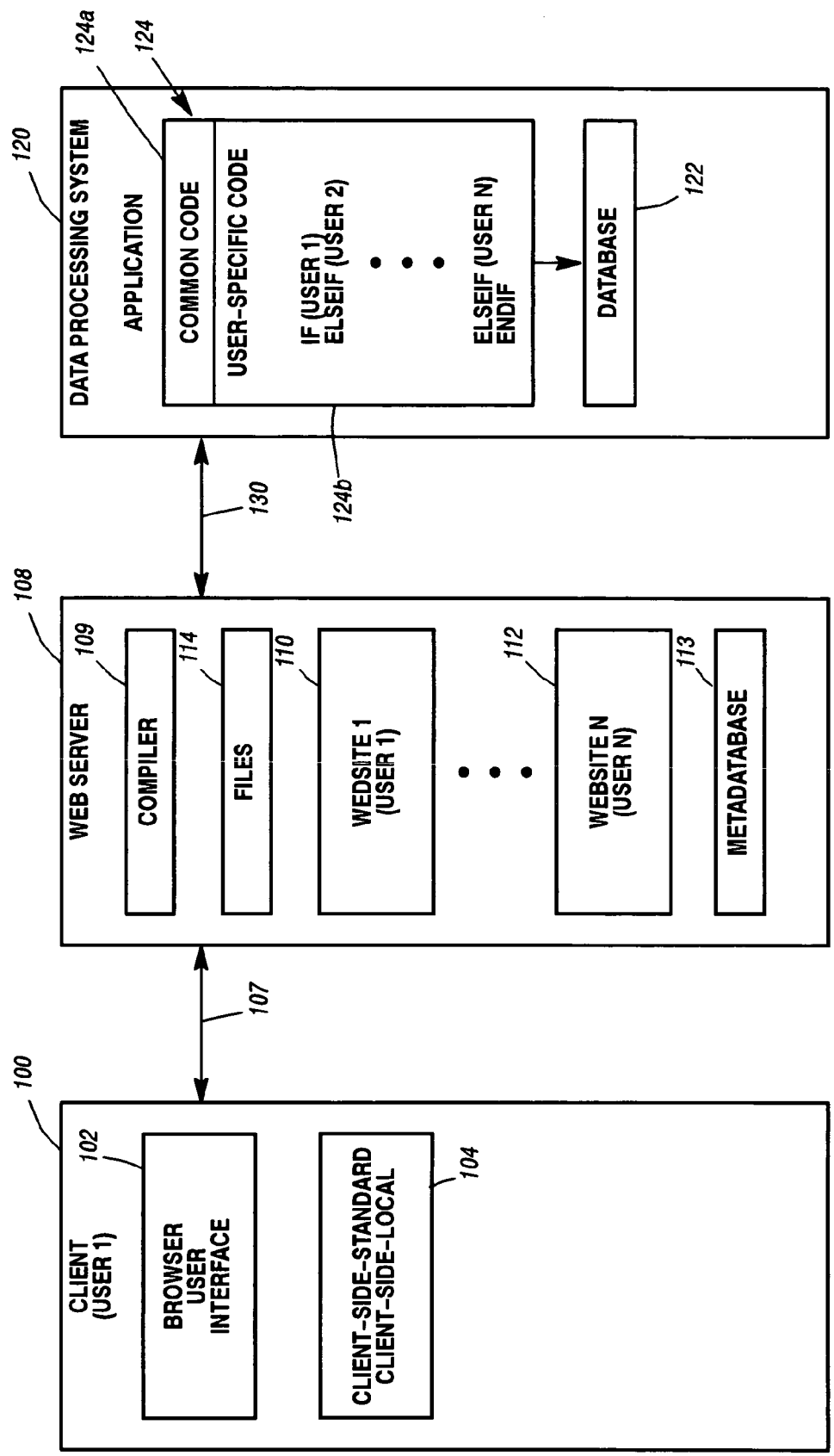
FIG. 1 is a block diagram of an exemplary system that may be adapted to use the current invention.

FIG. 1 is a block diagram of an exemplary system that may be adapted for use with the current invention. The configuration includes a client 100, shown as "user 1", which may be any type of workstation, personal computer, or other suitable system known in the art. In one embodiment, client 100 is executing a browser such as Internet Explorer commercially available from Microsoft Incorporated, or Netscape Navigator, commercially available from Netscape Communications Corporation. This browser supports a Browser User Interface (BUI) 102, which may be coded in Java script, Dynamic Hyper Text Markup Language (DHTML), or any other coding language that may be used for this purpose. This client is executing client side code contained in the "client_side_standard" and "client_side_local" files 104, as will be discussed further below.

In one exemplary system, BUI 102 is an interface for a cargo management system that schedules and tracks the shipment of cargo on airlines flights. This BUI may be executing on a workstation residing at an airlines office or warehouse, for instance. This type of system is described in commonly assigned patent application entitled "Logistics Management System Presenting User Interface for Performing Multiple Freight Management Tasks", Ser. No. 10/403,588, filed Mar. 31, 2003, which is incorporated herein by reference in its entirety.

Client 100 is coupled to a web server 108 over a network 107, which may be the Internet, an intranet, a TCP/IP network, or any other network adaptable for this purpose. Web server 108 executes server-side code to process requests that are received from client 100. In one embodiment, this web server is an Internet Information Services (IIS) server that supports a Common Object Module (COM) architecture, although other web server technologies may be employed. The server-side code may be implemented in Visual Basic (VB), Visual Basic for Applications (VBA), or any other suitable coding language.

A compiler 109 such as a Visual Basic compiler may reside on web server 108 to generate the various run-time environments residing on the server. These run-time environments, shown as website 1, 110 through website N, 112, include the executable code and associated data structures required to receive and process requests from BUI. In one embodiment, one or more of these run-time environments include a scripting engine to re-compile the executable code, as discussed below. Each of these websites may correspond to a different customer or user. For example, each user may be a different airline that is using BUI 102 to schedule shipments of cargo. Web server may further include a database such as metadatabase 113 that stores metadata used to generate the various run-time environments. In one embodiment, the database is a "metabase", which is a hierarchical database used to store configuration values for IIS. Finally, web server 108 stores files 114 which are also used to create the run-time environments in a manner to be discussed below.

Web server 108 is further coupled to a data processing system 120, which may be a ClearPath™ or an ES7000™ model system available from Unisys Corporation. Any other type of data processing system may be used in the alternative. This data processing system may include a database 122. Various software applications such as application 124 may be provided to access database 122.

During use, BUI 102 is used to make a request that is transferred via interface 107 to web server 108. This request may contain a query string or form data. This request will contain a port number, host address, Internet Protocol (IP) address, virtual directory, or some other indicia to identify one of the multiple websites 1 through N. The request will further identify the service that is to be run by the web server.

When web server 108 receives a request from the client system, the web server uses the request indicia to determine which website and service will process the request. In one embodiment, each website is associated with a respectively different customer or user that is employing an instance of BUI 102 to issue requests.

If the run-time code has already been generated by compiler 109 for this website, the requested service will be executed. Otherwise, if the run-time code has not been generated, or if web server 108 determines that one of the files used to generate the existing run-time code for that website has been modified such that the run-time environment is no longer current, compiler generates the run-time code needed to process the request. In one embodiment, this run-time code is a scripting engine that is cached for the website.

In response to the request, execution of the requested run-time code for the identified service and website will be initiated. If completion of this request requires access to data processing system 120, another request is issued via interface 130. This request will identify an application such as application 124 that is to be executed on data processing system 120. This request may require that data be stored to, or obtained from, database 122. Data may be returned via interface 130 to web server 108. This data may be reformatted by the website that received the initial request for return to client 100, generally in a Hyper Text Markup Language (HTML) form or a similar format.

As is discussed above, in some instances, it is desirable to customize an application for a particular user. For example, a cargo management system developed to support airline clients that are shipping cargo may be customized to take into account the specific needs and requirements of each user. According to the current invention, the code that implements the customized functionality may be segregated from standardized code. For example, in FIG. 1, files 104 residing on client 100 are shown to include "client_side_standard", which includes standard code that is applicable to all airline customers. This file may reside on the client systems of more than one user. In contrast, the file "client_side_local" may include "local" code that is "local to" (i.e., specifically customized for) the particular customer that is associated with client 100, shown as "user 1". This local code would not be resident on workstations associated with a different user.

Similarly, files 114 residing on web server 108 include standardized files that contain code applicable to all users. Others of these files contain code that is customized for a particular user. When compiler 109 generates the run-time script engine for a given one of the user-specific websites 1 through N, the web server uses both the standardize code files and the specific files that were developed for the associated user. This results in a website that contains code customized for the user. For example, the run-time environment of website 1 is generated using files that are customized for user 1, and includes executable code supporting functionality tailored to the specific requirements of user 1. The manner in which this is accomplished is discussed further below in reference to the remainder of the Figures.

User-specific code also resides on data processing system 120. This code is not generally compiled into user-specific code entities as it is on web server 108, however. Instead, an application such as application 124 will include both common code 124a that is standardized for all users, and one or more user-specific code sections 124b. Generally, the user-specific code sections are implemented using decisional code constructs that determine, based on one or more parameters that identify the user, which functionality is to be invoked. This user code could include one or more "if-else if" constructs to provide this decisional capability, for example. Before considering the run-time operation of the system of FIG. 1, more information is provided regarding files 104 and 114.

Figure 2:
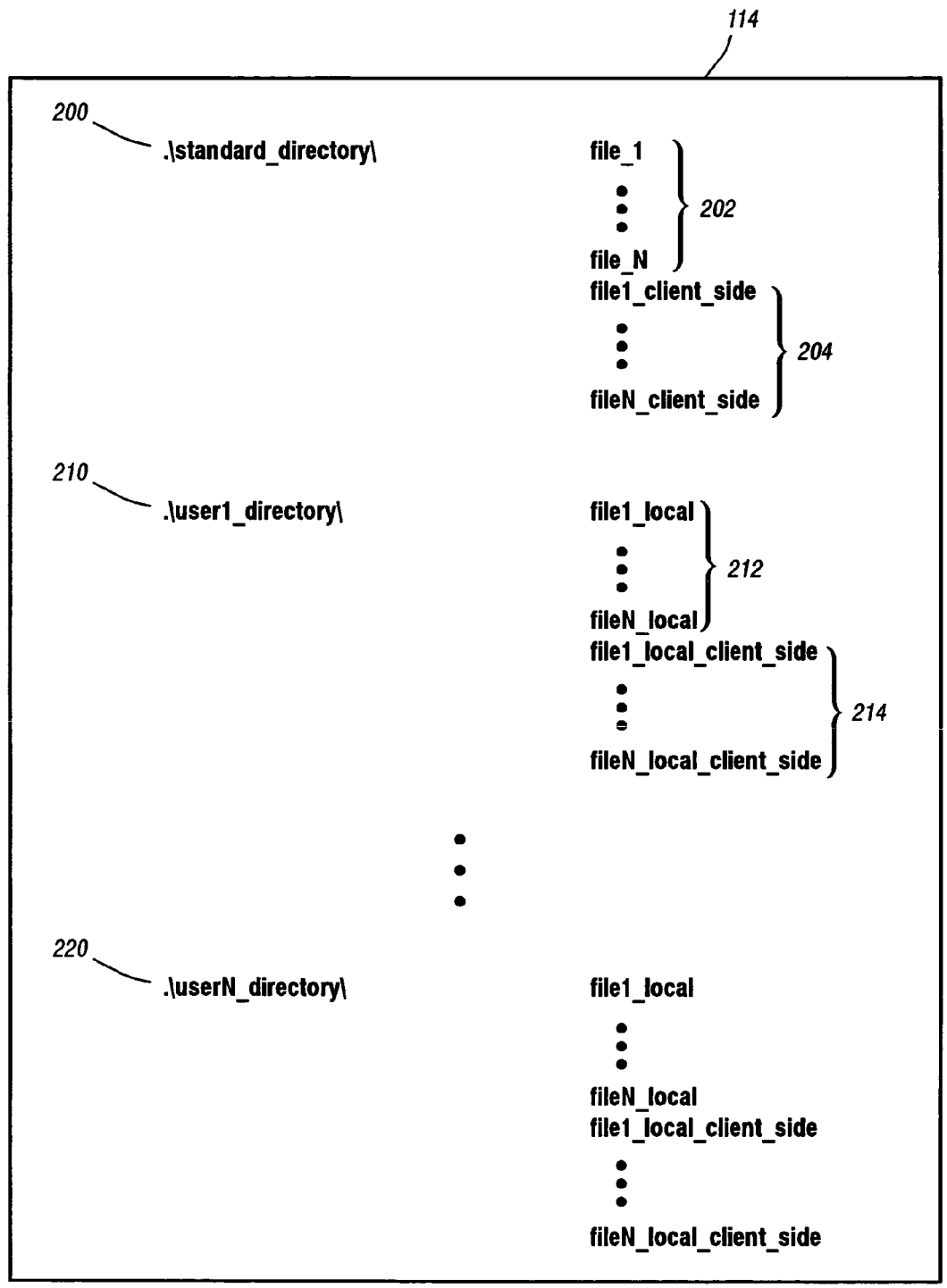
FIG. 2 is a listing showing an exemplary listing of files that reside on the web server of FIG. 1.

FIG. 2 is an exemplary listing of files 114 that reside on web server 108 of FIG. 1. This file listing includes both standardized code files and customized code files, as is discussed above. For example, a first directory labeled "standard_directory" 200 contains file_1 through file_N 202, which are standardized server-side files. Each of these files contains code that will be executed by any user of BUI 102. Compiler 109 uses these files to generate each of the websites 1 through N shown in FIG. 1.

Directory "standard_directory" further includes client-side files 204 such as file1_client_side, which contains standardized code that is to be executed on any client system running BUI 102. Web server copies these client-side files to a client on an as-needed basis as determined by the requests received from that client so that the appropriate processing can be completed by the client to fulfill the request.

In addition to "standard_directory" which contains the code that implements functionality to be employed by all users, each user is further provided with at least one respective directory including files dedicated to that user. These files include any code that will implement client-specific functionality. For example, directory "user1_directory" 210 includes all files associated with user1 functionality for website 1 110. This directory is shown to contain a respective file for each of the files in standard_directory. For instance, local code files 212 include file1_local through fileN_local that correspond respectively to file_1 through file_N 202. File1_local includes all of the local code that supports the user-specific functionality for user 1 that will be used to execute the services implemented by code stored within file_1, and so on. Similar client-side local files 214 are provided in this directory to support user-specific client-side code. These files are shown as file1_local_client_side through fileN_local_client_side 214, which correspond to the standardized client-side files 204. A similar directory is provided for each of the users. For example, directory 220 is shown for user N that contains local code files for website N that are similar to those residing within directory 210 for user 1.

As will become clear from the following description, not every file in directory 200 must be associated with local code files. For example, assume that all users may employ the standardized functionality embodied by the code of file_1 without modification. Therefore, the files shown as file1_local in the various user directories are not created. However, if even one user requires the use of customized code for file_1, each user must be provided with the file1_local local code file. This will be discussed further below.

Before continuing, it may be noted that the directory structure shown in FIG. 2 is merely an exemplary way of organizing the files. Any other directory structure may be employed. For example, all files could be included within the same directory, although this may be undesirable for security reasons. In another example, multiple sub-directories may be created within the user directories. For example, one directory may store server-side local code, and another directory may store client-side local code, and so on. Moreover, any file naming convention may be adopted to further aid in file organization. For instance, all local code files could include the characters "loc" or "local" in the file names. Specific pre-fixes and/or suffixes may be defined to further identify the local files and/or to designate whether they are client-side or server-side files.

Figure 3A:
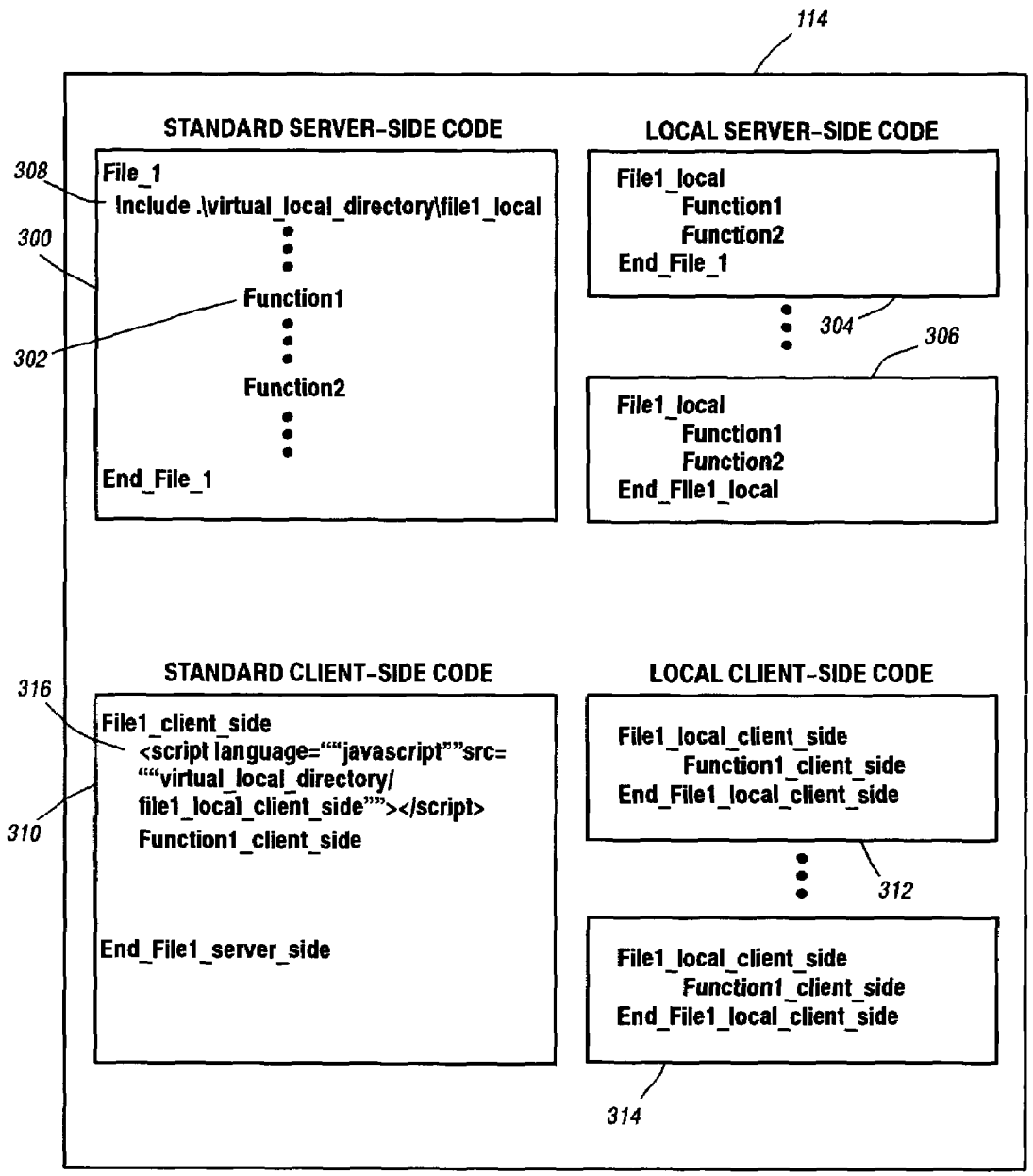
FIG. 3A is a block diagram illustrating an implementation of user-specific code according to the current invention.

FIG. 3A is a block diagram illustrating an implementation of the user-specific code of files 114 according to the current invention. File_1 300, which is shown residing in standard_directory 200 in FIG. 2, contains standard server-side code. A related file, file1_client_side 310, also shown residing in standard_directory 200 in FIG. 2, includes standard client-side code.

Each of files 300 and 310 are associated with a respective set of local files. For example, local files 304 through 306 are associated with standard file_1 300, and local files 312 through 314 are associated with standard file file1_client_side 310.

The use of the files shown in FIG. 3 can best be understood from the following example. Assume that user 1 wants to modify the server-side code contained in standardized code file_1, 300. In particular, this user wants to add a new function to the standardized code. Rather than adding this functionality directory to file_1, a "code hook" 302 is added to the code contained in file_1. This code hook consists of a function call to "function 1" that is inserted into the code of file_1 at the appropriate point in the instruction stream. This function call may invoke a subroutine "function1" that implements the new functionality, for example. This new function will be added to the associated local server-side file for file_1.

Next, assume a local server-side file does not already exist for file_1. That is, no user-specific code has been defined for any of the code included in file_1. In this case, the new local file file1_local 304 is created for file_1. This file includes the code for "function1" that is required by user 1. A file of the same name is created for each of the other users. For example, file 306 is shown created for user N. Each file includes any specialized code required by the associated user in performing the function. If only default processing is required for one or more of the users, the subroutine may include only standardized functionality, or may simply return to the calling program without performing any processing tasks.

Next, assume user N requires that a new function "function2" be added to file_1. A code hook is added at the appropriate place in file_1. Additionally, since the local file that is associated with file_1 already exists, the new function may be added to "file1_local" for user N. This new subroutine "function2" is also added to the local code files for each of the other users. If none of the other users requires specialized functionality, the subroutine may simply return to the calling code, or provide some type of standardized processing. Otherwise, the particular capability required by the user is added to the function for the user.

As can be appreciated from the foregoing, if a local code file is created for one user, a corresponding file must be created for all other users. Similarly, when a new function is defined for one user, that function must be included in the local code files for all users, even if that function is not needed, and does nothing more than execute a return to the calling code.

Next, within the standardized code file, which in this case is file_1 300, a reference must be made to the local code file. According to the current invention, this is accomplished using a reference to a virtual directory structure. As is known in the art, a virtual directory is an identifier that points to an actual physical directory existing on the system. A virtual directory is used to provide a level of indirection that allows an existing physical directory to be identified without specifying an actual directory path. Thus, a virtual directory name may or may not correspond to an actual physical directory. The manner in which virtual directories are mapped to actual physical directories is discussed below. Web servers such as Internet Information Services (IIS) commercially available from Microsoft Corporation, and other web server technologies, allow for the definition of these types of virtual directory structures.

In an embodiment wherein file_1 is coded in Visual Basic scripting, the reference to a virtual directory is made using an "include" directive having a format similar to the following:

'<!-- #include virtual="./virtual_local_directory/file1_local" -->'

This statement, shown as include statement 308 in FIG. 3, makes reference to a virtual directory called "virtual_local_directory" that contains the file "file1_local".

Finally, the virtual directories are associated with actual physical directories for each of the websites. That is, "virtual_local_directory" must be equated with physical directory "user1_directory" 210 that includes the file "file1_local" for website 1 110. Similarly, "virtual_local_directory" must be associated with "userN_directory" 220 for website N 112, and so on. As is known in the art, web servers such as IIS provide the capability to make this association between virtual and physical directories.

FIG. 3B is a table illustrating several entries of an exemplary database such as metadatabase 113 of FIG. 1. These entries create an association between a virtual and a corresponding physical directory structures. For example, entry 320 correlates the virtual directory "virtual_local_directory" with a physical directory "user1_directory" 210 that stores local files for website 1 110. Similarly, entry 322 associates this virtual directory with a physical directory "userN_directory" 220 that stores local files for website N 112. A database of this type will include an entry to map each virtual directory to a respective physical directory for each existing website.

In the foregoing manner, each website is associated with at least one virtual directory that corresponds with an appropriate physical directory containing files for that website. These one or more virtual directories are used by web server 108 when compiler 109 generates the run-time script engine for a website. For example, when compiler 109 of FIG. 1 generates website 110, database entry 320 is used to map virtual_local_directory to user1_directory. As such, the appropriate local code file "file1_local" from user1_directory is compiled along with the standardized code in file_1. Similarly, when website N is generated, compiler 109 utilizes the data included in database entry 322 for website N to map virtual_local_directory to userN_directory so that the local code file "file1_local" from the userN_directory is compiled along with the standardized code in file_1.

A similar process to the foregoing may be used to define code hooks for the client-side code. For example, in FIG. 3, the standardized client-side code in file "file1_client_side" 310 is modified to include the code hook "funcion1_client_side". A subroutine of this name is added to a local client-side code file for each user, shown as files 312 through 314. This subroutine need only contain default functionality for all users that do not require specialized operation. However, this subroutine will be modified to include customized code for the user requiring the special functionality. Finally, a reference to a virtual directory and file "file1_local_client_side" is added to "file1_client_side". In an embodiment wherein files 310, 312, and 314 are coded in a Java scripting language, this reference may be in the form of a java script tag 316 such as the following:

<script language=""JavaScript"" src=""virtual_local_directory/file1_local_client_side""></script>

Database entries similar to those shown in FIG. 3B must be defined to map the virtual directory "file1_local_client_side" to a physical directory for each website.

Figure 4:
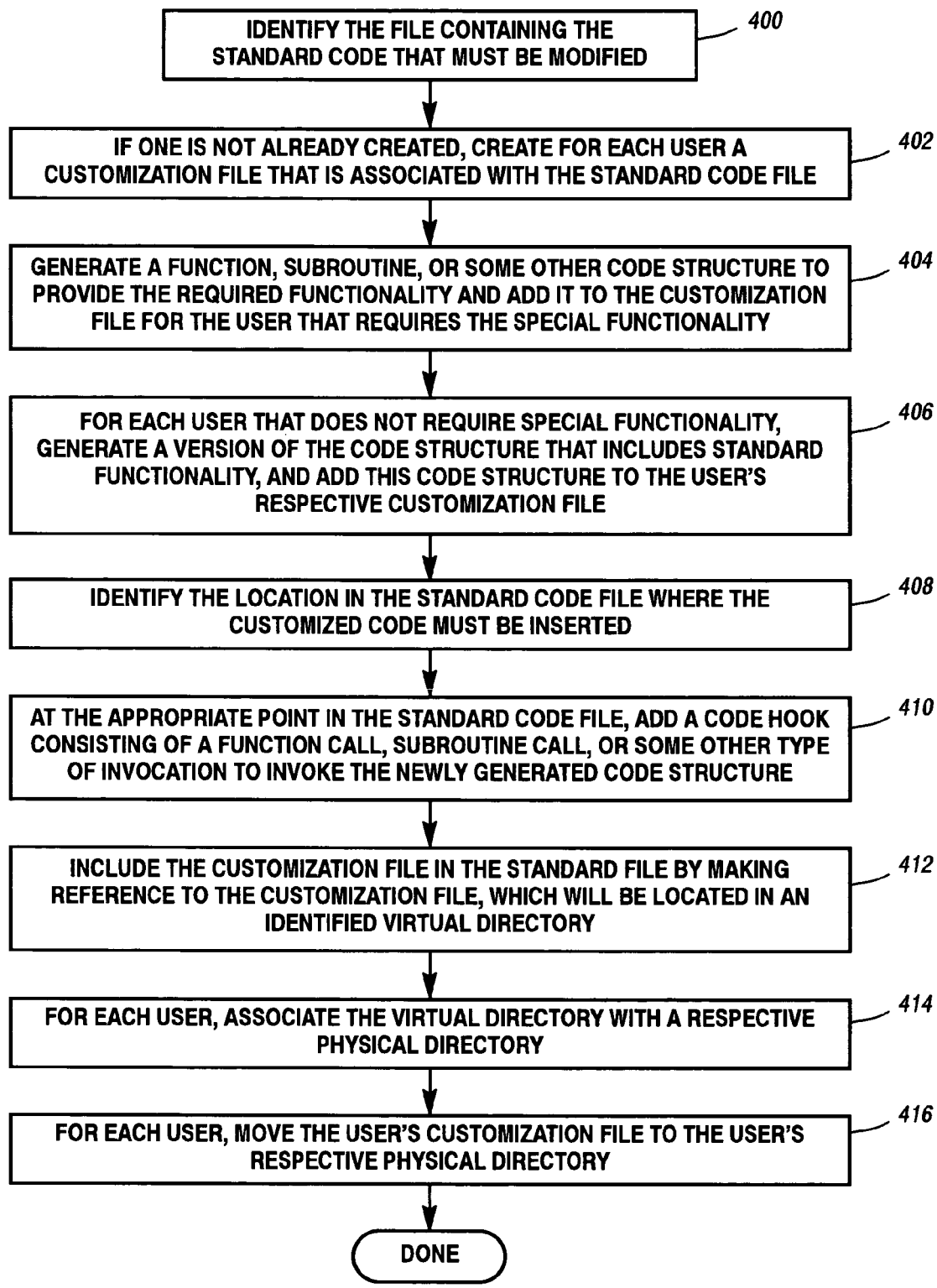
FIG. 4 is a flow diagram illustrating a method of implementing code according to the current invention.

FIG. 4 is a flow diagram illustrating a method of implementing code according to the current invention. It will be appreciated that the ordering of the steps in this Figure are largely arbitrary, and one skilled in the art will understand that these steps may be completed using many other sequences.

First, a user determines that some customization must be performed to modify standard functionality. Therefore, the user must identify the file containing the standard code that implements this functionality (400). Next, if a customization file for this standard code file does not exist, the file must be created (402). In one embodiment, a respective customization file is created for each user, including all users that do not require code customization.

A function, subroutine, or some other type of code structure is created to contain the customized functionality. This code structure is added to the customization file associated with the user requiring the code customization. (404). For all other users, a version of the code structure is created that does not include customization (406). This may include an extension of the standard functionality, or may merely execute a return to the calling program.

The location for insertion of customization code is identified in the standard file (408). A code hook is created to call the newly generated function, subroutine, or other code structure at this insertion point (410).

Next, the customization file must be included within the standard file (412). In one embodiment, this is accomplished by including a reference to the customization file within the standard file. This reference will identify a virtual directory that contains the customization file. In an IIS or another suitable environment, the reference to the customization file will be made using an "include" or other similar directive that identifies the customization file and virtual directory containing that file. In a client-side environment, a Java script tag will be used for this purpose.

The virtual directory containing the customization file must be mapped to a respective physical directory for each user (414). In one embodiment wherein each user is associated with a different respective website, an association must be created between the virtual directory and a corresponding physical directory for each website. The customization file for a given user is then moved to the respective physical directory for the user (416).

It may be noted that because virtual directories are used to identify the customization files in the foregoing manner, a single "hard coded" reference to a same file and virtual directory can be included within the standard code file. No conditional logic is required to make this identification. As discussed above, for each website, a virtual directory is associated with a physical directory by storing a physical directory path with the virtual directory name in a metadatabase maintained by the web server.

According to one aspect of the invention, various conventions may be established for creating the directory and file structures. For example, all customization code files may be designated using a predetermined prefix or suffix. In one embodiment, a different respective virtual directory is created to store the customization code associated with a given standard code file. This virtual directory is mapped to respective physical directories that are each associated with the standard code file and a particular user.

Figure 5:
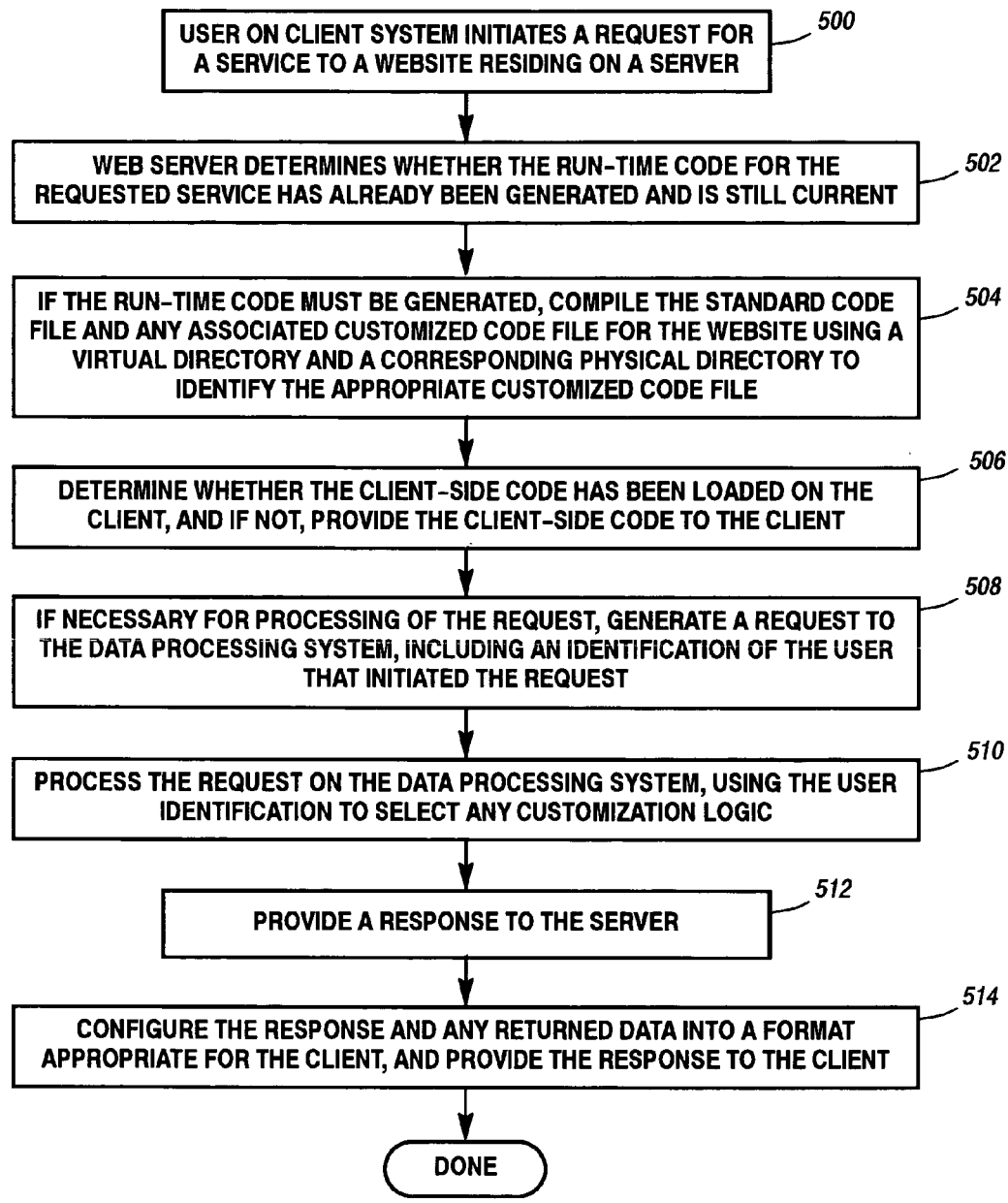
FIG. 5 is a flow diagram illustrating use of the invention within a system such as shown in FIG. 1.

FIG. 5 is a flow diagram illustrating use of the invention within a system such as shown in FIG. 1. A user such as user1 makes a request for a service on a client such as a workstation or personal computer (500). This request may be made using a BUI, for example. This request is transferred to web server 108, which then determines whether the run-time code for the requested service has already been generated and is still current (502). In particular, if the run-time code already exists, the web server determines whether any of the files associated with the service has been modified since the run-time was generated.

If the run-time does not exist, or if any of the files associated with the run-time has been modified since the run-time was generated, compiler 109 generates the run-time using the standard code file for the requested service, and any customization code file that is associated with the standard code file (504). The customization code file to be used for this purpose will be identified using the virtual directory and file name that is referenced in the standard file. This reference may be accomplished using an include directive or other similar statements that associate the customization file with the standard code. The web server then determines which physical directory is associated with the virtual directory for a particular website based on data stored within a metadatabase or similar data repository for the website. In one embodiment, each website corresponds to a different user, allowing each user to have a different respective customization file. Run-time generation occurs in the foregoing manner for both the server-side and client-side code.

Next, it is determined whether the client-side code has been loaded onto the client system. If not, the client-side scripting code, including any customization code, is transferred to the client (506).

Some requests may require that the web server 108 access a data processing system 120. This may be necessary, for example, to store data to, or retrieve data from, database 122. In these cases, the run-time code for the request generates an appropriately formatted request to the data processing system. This request is transferred via interface 130 to data processing system 120 (508). This request will include some type of indication as to which user initiated the request. In one embodiment, this indication may be provided by identifying the website that is processing the request.

Next, the data processing system processes the request (510). The user identification provided with the request is employed by conditional logic included within the invoked code to initiate the appropriate user-specific functionality. A response, including any data retrieved from database 122, is returned to web server 108 via interface 130 (512). Web server re-configures the response and any data into a format appropriate for the client, and provides the response to the client via interface 107 (514).

Figure 6:
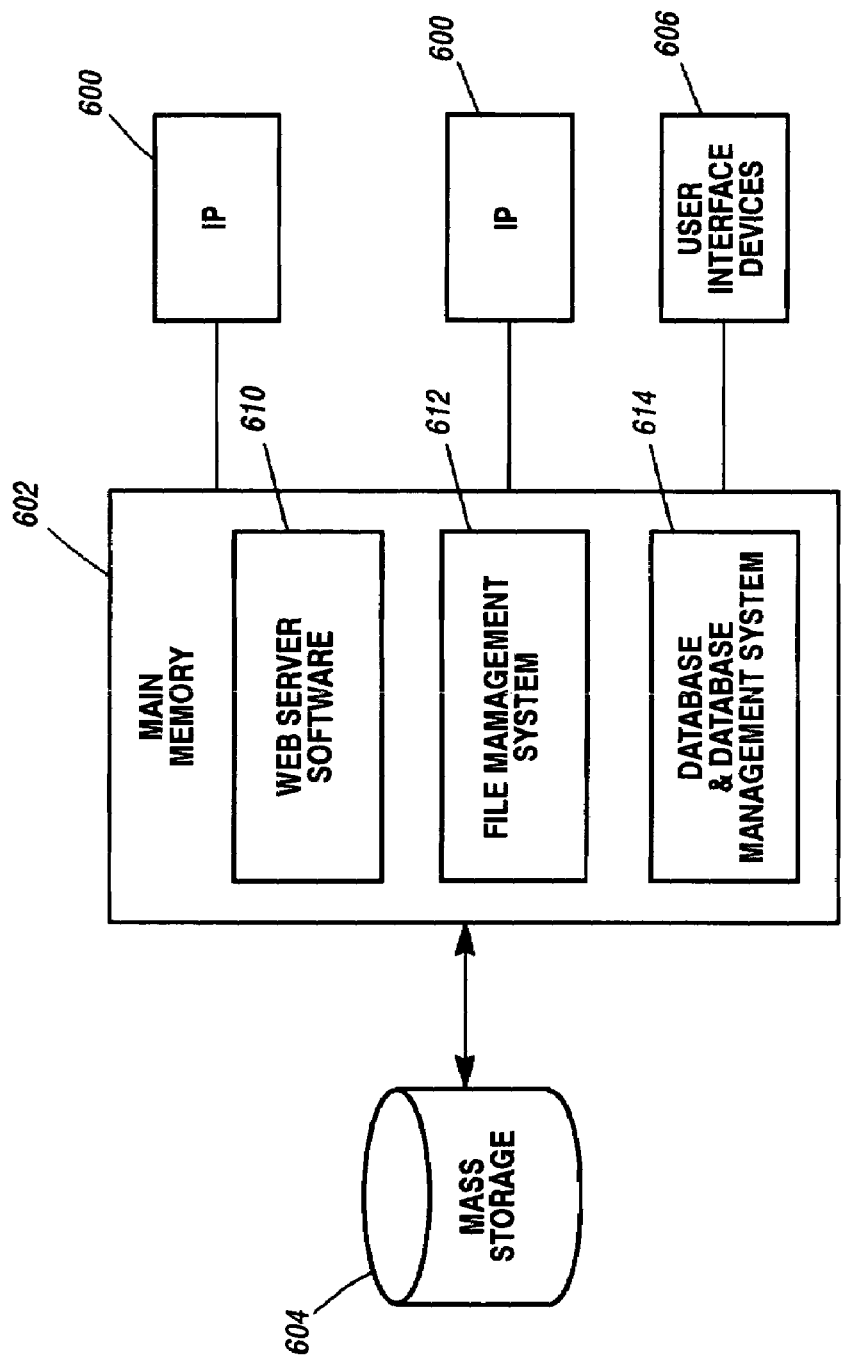
FIG. 6 is an exemplary data processing system that may be used to implement the web server.

FIG. 6 is an exemplary data processing system of the type that may be used to implement web server 108. The data processing system includes one or more instruction processors (IPs) 600 coupled to a main memory 602. The main memory may be further coupled to one or more mass storage devices 604 that include disk drives or other such devices. The main memory may further be coupled to one or more user interface devices 606 such as keyboards, display screens, cursor manipulation devices, speakers, and the like.

Main memory 602 may store web server software 610, a file management system 612 for maintaining a directory structure to manage files, and a database and associated database manager 614. The web server software 610 supports virtual directories in the manner discussed above. Database 614 may store data that associates virtual directories with physical directories, and in one embodiment, with respective websites, as shown by the exemplary database entries in FIG. 3. In another embodiment, the main memory may store some other types of data that are either contained within database 614 or stored in some other manner to make an association between virtual and physical directories.

Various implementations and embodiments of the invention have been described. Nevertheless, it is understood that various modifications can be made without departing from the invention. Accordingly, these and other embodiments are within the scope of the following claims.

What is claimed is:

1. A method of creating a customized version of software, comprising:
   a.) creating multiple versions of local code for the software, wherein at least two of the multiple versions contain different executable code and each of the multiple versions is associated with a respective user of the software, and storing each version of local code for the respective user in a respective physical directory for the respective user;
   b.) updating the software to call the local code;
   c.) making a reference to a virtual directory and the local code to include the local code in the software; and
   d.) for each of the versions of the local code, associating the virtual directory with the respective physical directory in which the version of the local code resides, wherein in response to a request from the respective user for the software having the reference to the virtual directory and the local code, the one of the multiple versions of the local code associated with the respective user is included in the software as indicated by a mapping of the respective user to the respective physical directory that contains the one of the multiple versions of the local code associated with the respective user.

2. The method of claim 1, wherein step c.) is performed using an include directive.

3. The method of claim 1, wherein step c.) is performed using a Java script tag.

4. The method of claim 1, wherein step d.) is performed using a database that stores data to associate each of the physical directories with the virtual directory.

5. The method of claim 1, wherein step d.) is performed on a web server having multiple websites, and wherein for each website, the virtual directory is associated with a different respective physical directory.

6. The method of claim 1, wherein step d.) is performed on a web server having multiple websites, and wherein each of the multiple users is associated with a different respective one of the multiple websites.

7. The method of claim 1, and further including generating, for each version of the local code, a respective run-time version of the code from the software and the version of the local code.

8. The method of claim 7, wherein the generating step includes:
   identifying a physical directory that is associated with the virtual directory for the user; and
   compiling the software along with the local code that is stored within the identified physical directory.

9. The method of claim 8, wherein the generating step is performed as the result of receiving a request from a client system of the user.

10. A system to support standard code that is customized for multiple users, comprising:
- a memory to store the standard code and associated multiple versions of local code, wherein a respective one of the multiple versions of the local code is provided for each of the users and at least two of the multiple versions contain different executable code;
- web server software stored within the memory to support virtual directories, and to associate each version of the local code with the standard code using a reference to a virtual directory; and
- data stored within the memory to associate, for each of the users, the virtual directory with a different respective physical directory, wherein the respective physical directory contains the respective version of the local code provided for the user, and in response to a request from the user for the standard code having the reference to the virtual directory, the respective one of the multiple versions of the local code for the user is provided for execution as indicated by a mapping of the user to the respective physical directory that contains the respective one of the multiple versions of the local code for the user.

11. The system of claim 10, wherein the web server software includes means for supporting multiple websites.

12. The system of claim 11, wherein each user is associated with a respective website, and wherein the data stored within the memory associates the respective physical directory with the respective website for the user.

13. The system of claim 10, wherein the memory includes circuits to store a compiler to generate a run-time version of code for each user, the run-time version to be generated from the standard code and the respective version of the local code for the user.

14. The system of claim 13, and further including a client system coupled to provide requests to the web server software, each request to include indicia to allow a respective run-time version of the code to be selected for execution to complete the request.

15. The system of claim 10, wherein the memory is included within a first data processing system, wherein the web server is adapted to receive requests for processing from users, each request to be processed by the standard code and an identified version of the local code, and further including a second data processing system coupled to the server system to perform one or more processing tasks required to complete the request.

16. The system of claim 15, wherein the one or more processing tasks are completed using indicia that identifies a user that initiated the request.

17. A data processing system, comprising:
- memory means for storing standard code and associated multiple versions of customized code for the standard code, wherein a respective one of the multiple versions of the customized code is provided for each of multiple users and at least two of the multiple versions contain different executable code;
- web server means for supporting virtual directories, and for allowing the customized code to be included with the standard code by providing a reference that identifies a virtual directory pointing to the customized code; and
- wherein the memory means includes circuits for storing data to associate the virtual directory with multiple physical directories, each physical directory to store a respective one of the multiple versions of the customized code for an associated user, and in response to a request from the associated user for the standard code having the reference to the virtual directory, the respective one of the multiple versions of the customized code for the associated user is provided for execution as indicated by a mapping of the associated user to the physical directory that contains the respective one of the multiple versions of the customized code for the associated user.

18. The system of claim 17, and further including compiler means for generating a run-time version of the code for a user from the standard code and the respective version of the customized code associated with the user.

19. The system of claim 17, wherein the web server means includes means for supporting multiple websites, each website associated with a respective run-time version of the code generated from the standard code and a respective version of the customized code.

20. For use in a data processing system that supports virtual directories that each points to a physical directory, a system to generate run-time code from standard code and customized code that is customized for users, comprising:
- first memory circuits to store the standard code and multiple versions of the customized code, wherein the standard code provides a reference to a virtual directory, and a respective one of the multiple versions of the customized code is provided for each of the users and at least two of the multiple versions contain different executable code;
- second memory circuits to store data associating the virtual directory with physical directories, each containing a respective version of the customized code;
- a processor coupled to obtain data stored within the first and second memory circuits, the processor, in response to a request from a particular one of the users for the standard code having the reference to the virtual directory, to utilize the reference provided by the standard code, the data associating the virtual and physical directories, and a mapping of the particular user to a respective one of the physical directories that contains the respective one of the multiple versions of the customized code for the user to identify a version of the customized code that was customized for the particular one of the users, and to generate the run-time code including the standard code and the identified version of the customized code.

21. For use on a data processing system storing a standard software application and multiple versions of customized code developed for use with the standard software application, a method comprising:
- a1.) providing a virtual directory that is associated with multiple physical directories, each physical directory being associated with a respectively different user of the data processing system and each physical directory including a respective version of the customized code, wherein at least two of the multiple versions contain different executable code;
- a2.) receiving a request identifying a user of the data processing system and the standard software application;
- b.) identifying a virtual directory that is associated with the standard software application;
- c.) identifying a respective physical directory associated with the user identified in the request and that is pointed to by the virtual directory as indicated by a mapping of each user to a respective one of the physical directories;

d.) obtaining a version of the customized code that is adapted for the user identified in the request from the identified physical directory; and e.) generating a run-time version of the code that includes the standard software application and the version of the customized code that is adapted for the user identified in the request.

22. The method of claim 21, and further including:

receiving another request identifying the user and the standard software application; and determining whether the standard software application or the version of the customized code adapted for the user has been modified since the run-time version of the code was generated, and if so, generating another run-time version of the code for the user that includes a latest version of both the customized code adapted for the user and the standard software application.

23. The method of claim 21, wherein the standard software application includes client-side code and server-side code, wherein multiple versions of customized code has been developed for at least one of the client-side code and the server-side code, and further including performing steps b.) through e.) to generate a run-time version of at least one of the client-side code and the server-side code.

24. The method of claim 22, wherein a client system is coupled to the data processing system, and further including copying a run-time version of the client-side code to the client system.

25. The method of claim 21, wherein step b.) is performed using a reference to the virtual directory that is provided with the standard software application, the reference being selected from the group consisting of an include directive and a Java script tag.

* * * * *